United States Patent [19]

Guerrieri

[11] 4,061,715

[45] Dec. 6, 1977

[54] PROCESS FOR CONVERSION OF ALKALINE EARTH SULFITES AND BISULFITES INTO OXIDES AND CARBONATES

[76] Inventor: Salvatore A. Guerrieri, 503 Beverly Road, Newark, Del. 19711

[21] Appl. No.: 485,918

[22] Filed: July 5, 1974

[51] Int. Cl.² .................. C01B 17/00; C01F 1/00; C01F 5/24; C01B 13/14
[52] U.S. Cl. .................. 423/242; 423/155; 423/431; 423/638
[58] Field of Search .................. 423/242–244, 423/563, 562, 159, 155, 165, 431, 638

[56] References Cited

U.S. PATENT DOCUMENTS

| | | | |
|---|---|---|---|
| 2,726,930 | 12/1955 | Edwards et al. | 423/438 |
| 3,402,998 | 9/1968 | Squires | 423/431 |
| 3,475,121 | 10/1969 | Thornton | 423/244 |
| 3,542,511 | 11/1970 | Shah | 423/242 |
| 3,574,350 | 4/1971 | Suriani et al. | 423/244 |
| 3,574,543 | 4/1971 | Heredy et al. | 423/242 |
| 3,574,544 | 4/1971 | Heredy et al. | 423/242 |
| 3,917,795 | 11/1975 | Pelczarski et al. | 423/563 |

*Primary Examiner*—Earl C. Thomas
*Assistant Examiner*—Gregory A. Heller

[57] ABSTRACT

There is disclosed a process for converting an alkaline earth metal sulfite or bisulfite selected from the group consisting of the sulfites or bisulfites of calcium and magnesium into an oxide form by reaction with hydrogen and water vapor at elevated temperatures particularly in connection with processes for the treatment of flue gases to reduce the amount of sulfur dioxide therein.

10 Claims, 2 Drawing Figures

PROCESS FOR CONVERSION OF ALKALINE EARTH SULFITES AND BISULFITES INTO OXIDES AND CARBONATES

FIELD OF THE INVENTION

This invention relates to treatment of an alkaline earth metal sulfite to form an alkaline earth metal oxide, and more particularly to the regeneration of aqueous alkaline earth oxide suspensions for the treatment of sour industrial gases prior to the discharge thereof into the atmosphere, especially gases produced by the combustion of sulfur bearing fossil fuels.

BACKGROUND OF THE INVENTION

A large number of processes have been proposed for removing sulfur dioxide from flue gases. The stage of development of these processes ranges from preliminary tests of conceptual designs to full scale tests in commercial plants. Among the latter, the removal of sulfur dioxide using aqueous slurries of calcium carbonate or calcium oxide has been a preferred process as a result of the many years of commercial testing as well as an abundant supply of relatively cheap reactive agent.

The process is severely handicapped, however, because it has not been possible to recover spent chemicals and is thereby confronted with a difficult disposal problem. One aspect of this problem is the need to haul spent chemicals to a suitable dumping area where the chemicals will not result in water and air pollution. Thus the process does not necessarily abate pollution, it only transfers the problem from one location to another.

Another negative factor is plugging and corrosion encountered in various areas of the gas scrubber elements during operation. The net result is that the operating time efficiency for such scrubbers has been extremely low in almost all cases where such scrubbing processes have been used and no process has given continuous runs exceeding a few weeks' duration. Most runs have been short and have interfered with proper operation of electric power generators. Such difficulties, added to the sludge disposal problem, have given the scrubbing process a poor reputation with a resulting negative attitude by the public utilities towards all sulfur dioxide removal processes.

It must be noted, however, that intensive effort is being applied to overcome technological problems associated with sulfur dioxide removal. A promising variation, in the pilot plant stage, is the double alkali process which uses a solution of sodium hydroxide in the scrubber to derive a solution of sodium sulfite or bisulfite and to react the latter with an alkaline earth oxide, such a calcium oxide, to recover sodium hydroxide for re-use in the scrubber with the concomitant conversion of calcium oxide to calcium sulfite. This process solves many of the problems concerning scrubber operation, but does nothing for the calcium sulfite disposal problem.

OBJECTS OF THE INVENTION

An objective of the present invention is to provide a process for the treatment of an alkaline earth metal sulfite to form an alkaline earth metal oxide or carbonate.

Another object is to provide a process for the treatment of an alkaline earth metal sulfite or bisulfite selected from the group consisting of the sulfites or bisulfites of calcium and magnesium sulfite to form the corresponding oxide or carbonate.

Still another object of the present invention is to provide a process for regenerating aqueous absorption solutions and suspensions of reactive chemicals selected from the group consisting of calcium carbonate, calcium oxide, magnesium carbonate and magnesium oxide utilized in the treatment of sour industrial gases to reduce the amount of sulfur dioxide introduced into the atmosphere.

A still further object of the present invention is to provide a flue gas treating process which minimizes the amount of spent chemical which must be discarded.

SUMMARY OF THE INVENTION

In accordance with one embodiment of the present invention, an alkaline earth metal sulfite or bisulfite selected from the group consisting of the sulfite and bisulfite of calcium abd magnesium is contacted with hydrogen and water vapor at elevated temperatures to form the corresponding oxide. Such contact may also be sequentially effected in two zones. i.e., first hydrogen and thence water vapor. Should the carbonate form of the alkaline earth metal be desired, the alkaline earth metal sulfite is first contacted with hydrogen in a first zone with the resulting solids being contacted with carbon dioxide introduced into a second zone where the solids are held in suspension in water. Hydrogen sulfide produced in the latter reaction may be passed to a user station or may be converted into elemental sulfur, such as in a modified Claus process as is known to those skilled in the art.

In a particularly preferred embodiment of the present invention, the alkaline earth metal sulfite is recovered from or formed in a sulfur dioxide scrubber operation as part of a sour gas treating process, including the hereinabove described double alkali process.

Another embodiment of the present invention includes the conversion of the alkaline earth metal sulfide into the carbonate form by contacting an aqueous suspension of the corresponding sulfide with gaseous carbon dioxide. If desired, the alkaline metal carbonate can be converted into the corresponding oxide by any of the well-known processes of decomposing a carbonate at elevated temperatures.

BRIEF DESCRIPTION OF THE DRAWINGS

The invention will be more clearly understood by reference to the following detailed description of an exemplary embodiment thereof in conjunction with the accompanying drawings wherein like numeral designates like items therein and in which.

DETAILED DESCRIPTION OF THE DRAWINGS

Figure 2:
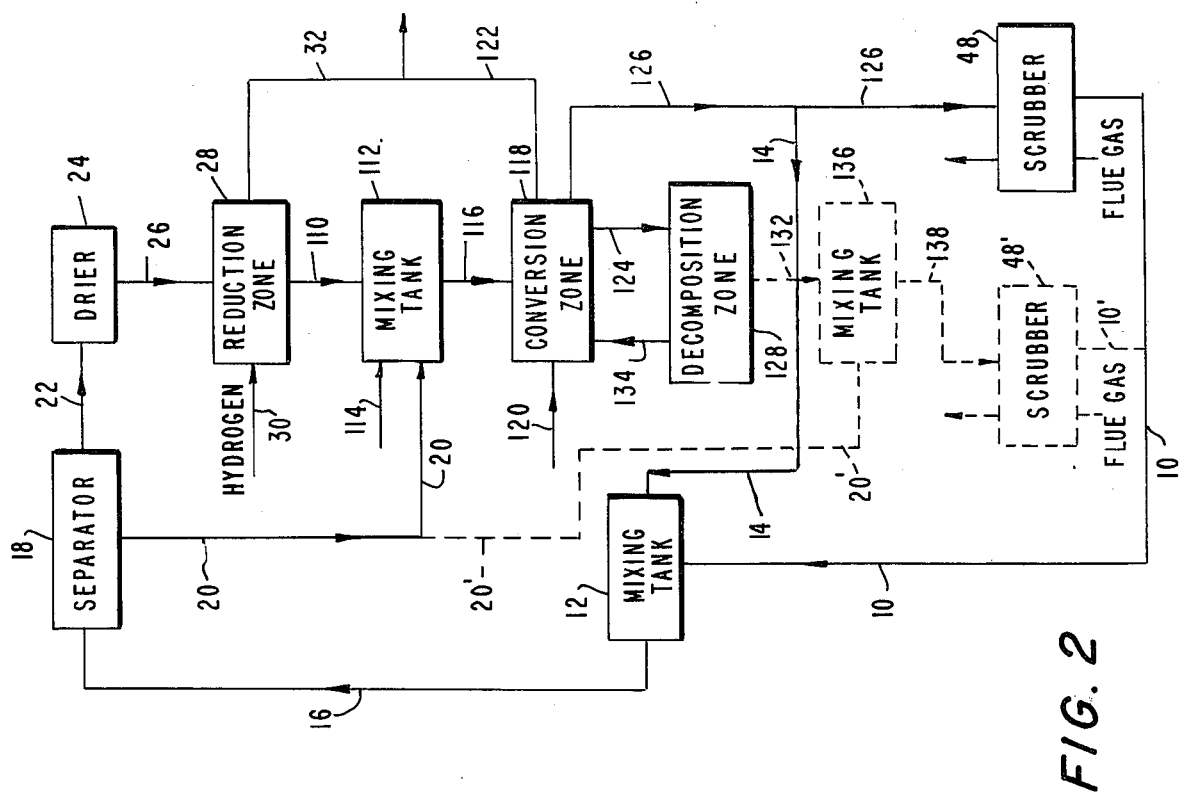
FIG. 2 is a schematic flow diagram of another embodiment of the present invention.

It is understood that standard equipment, such as certain pumps, heat exchangers, valves, indicators, and the like have been omitted from the drawing to facilitate the description thereof and that the placing of such equipment at appropriate places is deemed to be within the scope of those skilled in the art.

Figure 1:
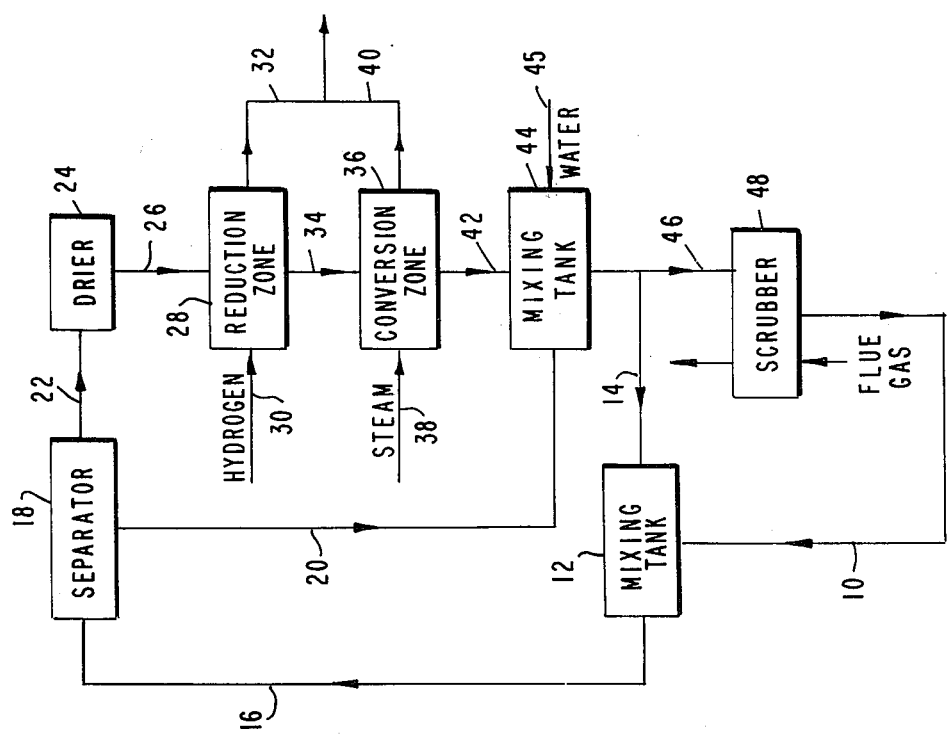
FIG. 1 is a schematic flow diagram of one embodiment of the present invention thereof.

In FIG. 1, an aqueous alkaline earth metal sulfite slurry in line 10 is passed to a mixing tank 12 into which an alkaline earth metal oxide is introduced through line 14 should the aqueous slurry contain the alkaline earth metal bisulfite to convert same into the less soluble alkaline earth metal sulfite. The aqueous slurry in mixer 12 is withdrawn and passed by line 16 to a separator 18, such as a filter or centrifuge, wherein solids are separated from a mother liquor. The mother liquor may be recycled by line 20 to a scrubber operation as more fully hereinafter described.

Wet solids are withdrawn from separator 18 by line 22 and introduced into a drier 24 to remove adherent and combined water. The drier 24 may be provided with size reduction capabilities to reduce any lumps which may be formed in the drying operation since large particles adversely effect transfer properties and reaction rate in subsequent steps. It is believed, however, that a properly designed drier would eliminate any need for size reduction capabilities. Water vapor formed in the drier 24 may be vented to the atmosphere or may be condensed and recycled (not shown) to the process.

Dried particulate material is withdrawn from drier 24 by line 26 and is introduced into a reduction vessel 28 wherein the material is contacted at elevated temperatures with an excess of hydrogen introduced through line 30. The alkaline earth metal sulfite is thereby reduced to the corresponding alkaline earth metal sulfide with water vapor being liberated in accordance with the following overall equation (1), wherein M is an alkaline earth metal selected from the group consisting of calcium and magnesium:

$$MSO_3 + 3H_2 = MS + 3H_2O \tag{1}$$

It is also understood that many side reactions also take place including the disproportionation of the metal sulfite and partial conversion of the sulfide to produce hydrogen sulfide.

A gas is withdrawn from the reduction vessel 28 including unreacted hydrogen, water vapor, and hydrogen sulfide and is passed through line 32 to an elemental sulfur unit (not shown) or user of hydrogen sulfide (not shown). A solid product is withdrawn from reduction vessel 28 by line 34 and is passed to a conversion vessel 36 wherein the solid material is contacted at elevated temperatures with an excess of water vapor introduced by line 38. The alkaline earth metal sulfite is converted to the corresponding metal oxide with hydrogen sulfide being liberated, in accordance with the following overall equation (2):

$$MS + H_2O = MO + H_2S \tag{2}$$

A gas including unreacted water vapor as well as hydrogen sulfide is withdrawn from conversion vessel 36 by line 40 and is combined with the gas in line 32 to be passed to a sulfur unit or other user as hereinabove described. A solid product is withdrawn from conversion zone 36 through line 42 and is passed to a storage zone (not shown) or into a mixing vessel 44 wherein the solid is admixed with water and mother liquor introduced by lines 45 and 20 respectively, for the preparation of an aqueous scrubbing mixture, which in accordance with one embodiment of the present invention is passed by line 46 to a scrubbing assembly 48.

Since the reduction vessel 28 and conversion vessel 36 may be operated at substantially the same pressure (about atmospheric) and at the same elevated overall temperatures between about 450° F. and 950° C., it may be advantageous in most instances to combine the reactions of equations (1) and (2) into a single operation, as hereinabove mentioned, to reduce investment cost and to simplify the operation and as represented by the equation (3):

$$MSO_3 + 3H_2 = MO + H_2S + 2H_2O \tag{3}$$

Such saving may be counter-balanced, in part, by the need to increase the amount of excess hydrogen which may be required or to increase the residence time of the solids in a single vessel. The preferred alternative may only be determined on a case by case basis.

Referring now to FIG. 2 wherein like numerals designate like items, alkaline earth metal sulfide withdrawn from the reduction Zone 28, as hereinabove described, is passed by line 110 to a mixing vessel 112 wherein an aqueous suspension of solid is formed with water introduced through line 114 and mother liquor through line 20. The aqueous mixture is passed through line 116 to a conversion vessel 118 and intimately contacted at elevated temperatures with carbon dioxide introduced through line 120. By this process, the alkaline earth metal sulfide is converted into the alkaline earth metal carbonate and hydrogen sulfide in accordance with the following overall equation (4):

$$MS + CO_2 + H_2O = MCO_3 + H_2S \tag{4}$$

The liberated hydrogen sulfide together with water vapor and excess carbon dioxide is passed by line 122 to a user operation (not shown) as discussed in connection with FIG. 1.

In the case of a particular scrubber system using an alkaline metal carbonate, the metal carbonate is sent directly to a scrubber assembly 48 through line 126. In the case of a scrubber assembly system 48' using alkaline metal oxide, (as illustrated by the dotted lines in FIG. 2) the mother liquor feed to mixer 112 is omitted and the solid product from conversion zone 118 is passed through lines 124 to a decomposition zone 128 wherein the carbonate is disassociated into the metal oxide. The latter is conveyed through line 132 into mixer 136 wherein the oxide is suspended in mother liquor from separator 18 through line 20 prior to being passed to the scrubber assembly 48' by line 138. Carbon dioxide is recycled to the conversion vessel 118 through line 134.

EXAMPLES OF THE INVENTION

The examples which follow are illustrative of the practice of the invention, but are not intended to limit the scope thereof.

EXAMPLE NO. 1

Calcium sulfite is placed in a test tube and water added to give a moderately thin slurry. Carbon dioxide is bubbled through the suspension for a period of 20 minutes. Conversion of the sulfide into the carbonate form according to the following equation (5) is slight:

$$CaS + CO_2 + H_2O = CaCO_3 + H_2S \tag{5}$$

EXAMPLE NO. 2

Example No. 1 is repeated except that the test tube containing the aqueous suspension of calcium sulfide is heated to near its boiling point. Upon bubbling carbon dioxide through the hot suspension for about 20 minutes, substantially complete conversion of the sulfide into the carbonate is observed.

EXAMPLE NO. 3

Calcium sulfide is placed in a graphite boat in the combustion tube of a furnace. Steam is passed over the sample at a temperature of about 400° C. for 30 minutes with no apparent reaction.

EXAMPLE NO. 4

Example No. 3 is repeated except at a temperature of about 980° C. The run is stopped after 30 minutes with substantially complete conversion of the sulfide into the oxide.

EXAMPLE NO. 5

Calcium sulfide is introduced into a graphite boat heated in the furnace described above (Example No. 3) with hydrogen being passed over the sample for 25 minutes at about 720° C. Substantially total reduction of the sulfite to the sulfide is observed. Hydrogen sulfide is observed in the exiting gas indicating the occurrence of the following secondary reaction (6):

$$CaS + H_2 = CaO + H_2S \quad (6)$$

EXAMPLE NO. 6

Calcium sulfite is introduced into a graphite boat heated in the furnace described above (Example No. 3) with a mixture of hydrogen and water vapor being passed over the sample at about 950° C. for about 30 minutes. Substantially total conversion of the sulfite to the oxide is obtained.

EXAMPLE NO. 7

Magnesium ($MgSO_2.6H_2O$) is placed in a graphite boat in the combustion tube of a furnace preheated to a temperature of about 110° C. A mixture of hydrogen and water vapor are passed over the sample at a temperature of 650° C. for 25 minutes. The furnace is thereafter maintained at 650° C. for 20 minutes. Substantially complete conversion of the sulfide into the oxide is observed.

The present invention has been described with reference to flue gas scrubbing processes, but it will be readily apparent that the present invention is applicable in other processes which require the conversion of calcium or magnesium sulfites into oxides or carbonates.

Numerous modifications and variations of this invention are possible without departure from the invention in its broader aspects. The aim of the appended claims, therefore, is to cover all such variations as fall within the true spirit and scope of the invention.

What is claimed is:

1. A process for treating an alkaline earth metal sulfite or bisulfite selected from the group consisting of the sulfite or bisulfite of calcium and magnesium in particulate form to recover the alkaline earth metal values thereof in the form of an alkaline earth metal oxide which comprises: contacting said alkaline earth metal sulfite with a gaseous stream including hydrogen and water vapor at a temperature of from 450° to 1000° C.

2. The process as defined in claim 1 wherein said alkaline earth metal sulfite is first contacted with hydrogen.

3. The process as defined in claim 2 wherein the solid resulting from said contact is subsequently contacted with water vapor.

4. The process as defined in claim 3 wherein each contact is effected in separate conversion zones.

5. The process as defined in claim 4 wherein said contacts are effected at about atmospheric pressure.

6. The process as defined in claim 5 wherein the alkaline earth metal sulfite or bisulfite to be treated is obtained by contacting a slurry of an alkaline earth metal oxide with a sour gas containing sulfur dioxide.

7. The process as defined in claim 6 wherein said alkaline earth metal sulfite is separated from a slurry thereof and dried prior to said contact with said gaseous stream.

8. The process as defined in claim 7 wherein an amount of alkaline earth metal oxide is added to the slurry to convert any alkaline earth metal bisulfite to alkaline earth metal sulfite prior to said separation.

9. In a process for treating an alkaline earth metal sulfite or bisulfite selected from the group consisting of the sulfite or bisulfite of calcium and magnesium to recover the alkaline earth metal carbonate, the improvement comprising contacting at elevated temperatures said alkaline earth metal sulfite with a gaseous stream consisting of hydrogen and contacting the resulting solid at elevated temperatures with carbon dioxide.

10. The process as defined in claim 9 wherein an alkaline earth metal carbonate is obtained which is subsequently heat treated to form the corresponding alkaline earth metal oxide and a recycleable carbon dioxide stream.

* * * * *